Jan. 5, 1971  E. L. ANDERSON  3,553,043

METHOD OF BONDING SELECTED EDGES OF GLASS

Filed May 3, 1967

INVENTOR.
ELMER L. ANDERSON
BY
Charles W. Gregg
AGENT

United States Patent Office 3,553,043
Patented Jan. 5, 1971

3,553,043
METHOD OF BONDING SELECTED EDGES OF GLASS
Elmer L. Anderson, Corning, N.Y., assignor to Corning Glass Works, Corning, N.Y., a corporation of New York
Filed May 3, 1967, Ser. No. 635,901
Int. Cl. B32b 17/06
U.S. Cl. 156—107                      4 Claims

ABSTRACT OF THE DISCLOSURE

A method of bonding to each other uncured silicone rubber and glass by using flexible, resilient or elastic membranes actuated by heated pressurized fluid to press the glass and rubber into intimate contact with each other while at least partially curing the rubber by heat supplied thereto through the membranes from the heated fluid.

BACKGROUND OF THE INVENTION

The present invention relates to the art of bonding and, more particularly, to a method of bonding silicone rubber and glass to each other. Still more specifically the invention relates to a method of bonding juxtaposed edges of two pieces of glass to opposite edges of a piece of silicone rubber to provide, for example, a hinged window.

In the relatively compact automobiles of the so-called convertible type in use today, that is, of the type having flexibly folding tops, there is often a very minimum amount of space in the compartment which is intended to hold the flexible top when in its folded or "top-down" condition. Such tops embody rear windows for rear-view purposes and such windows being usually made of glass often present problems when it is desired to provide compartments which utilize a minimum of space as possible for holding the folded tops. That is to say, such rear windows usually cover an appreciable expanse of the rear panels of the holding tops and are usually of sufficient inflexibility as to limit the extent to which the tops can be folded for compact enclosure in their storage compartments. Accordingly, it has been recognized for some length of time that it would be expedient in many cases to have folding rear glass windows for convertible automobile tops, that is, windows comprising two or more pieces of glass which are hinged to each other for folding of the windows. However, it is readily apparent that such folding windows should obstruct the rear view of the operator of the convertible automobiles to the very minimum extent possible. The method of the present invention was, therefore, developed for the purpose of providing hinged rear glass windows for convertible automobile tops. The foregoing information is given merely to set forth the background of the development of the present invention and as one example of the utility of the invention. However, the method of the invention is not intended to be confined merely to the use of making folding glass windows but, as is readily apparent, the inventive method disclosed can be used for flexibly bonding two or more pieces of glass to each other by the use of silicone rubber therebetween and for many other purposes.

SUMMARY OF THE INVENTION

In practicing the invention the edges of two or more pieces of glass are juxtaposed with a piece of uncured silicone rubber placed therebetween and with the edges of the rubber abutting said edges of the glass. The rubber is then compressed between said glass edges to conform the edges of the rubber to the contours of the glass edges. Pressing platents having flexible, resilient or elastic membranes or diaphragms disposed above and below the pieces of glass and rubber are supplied with a heated pressurized fluid for a selected time-temperature cycle and said membranes are thereby actuated into contact with the glass and rubber to supply pressure to the rubber and maintain it between the edges of the glass while at least partially curing the rubber to bond or cement it to the glass. Further curing of the rubber may thereafter be performed by baking the bonded glass and rubber in a suitable oven if necessary, optimum bonding between the items thereby being attained.

BRIEF DESCRIPTION OF THE DRAWINGS

Similar reference characters refer to similar parts in each of the figures of the drawings.

DESCRIPTION OF THE PREFERRED EMBODIMENT

Figure 1:
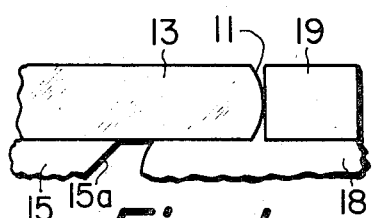
FIGS. 1 through 3 of the drawings illustrate sequential steps of the method embodying the invention.

The edge of each piece of glass to be bonded in accordance with the present invention is cut and ground as straight and even as possible along the length thereof. Each of said edges is also rounded off in the direction of the depth or thickness of such edge to reduce the acuity of the angles where the edge meets the top and bottom surfaces of the respective piece of glass. Such rounding off is also performed by grinding said edges. Referring to the drawings it will be seen that the edges 11 and 12 of two pieces of glass 13 and 14, respectively, to be bonded are rounded off as described. This is best seen by viewing FIG. 5 of the drawings.

The ground edges of the pieces of glass to be bonded are thoroughly cleaned by scrubbing or scouring them with warm water and a suitable glass cleanser or soap such as, for example, Bon Ami® soap, such trademark being a registered trademark of Bon Ami Company, 445 Park Ave., New York, N.Y. Following such cleaning of the edges they are thoroughly rinsed and then allowed to dry in clean air, care being taken that the edges are not touched by the fingers or other foreign objects.

It is preferable, for purposes of providing optimum bonding between the edges of the glass and the silicone rubber, that a primer solution, suitable to the type of silicone rubber employed, be applied to the edges of the glass prior to the actual process of bonding such edges to the silicone rubber. The manufacturers of silicone rubber supply primers for mixing primer solutions suitable to the various types of silicone rubber which they manufacture and suitable for the purpose for which a specific type of silicone rubber is to be employed. For example, it is preferred in the practice of the invention to employ Silastic® S2029 silicone rubber, such trademark being a registered trademark of Dow Corning Corporation, Midland, Mich. When such silicone rubber is used in the practice of the invention, a suitable primer for mixing the primer solution to be applied to the edges of the glass is Silane Z6030 primer, also supplied by Dow Corning Corporation. The primer solution is preferably mixed and applied to the edges of the glass in the following described manner.

In 100 parts of distilled water there is thoroughly mixed a 0.32 part of glacial acetic acid. To such mixture is added 1 part of the Silane Z6030 primer and the resultant mixture is lightly agitated, by stirring for example, until the ingredients are dissolved and form an aqueous solution. Such solution is applied to the previously cleaned edges of the glass as by a lint-free cloth soaked in the solution and it is, of course, expedient to insure that the solution is well applied over each entire edge to be bonded to the silicone rubber. The primer solution is then allowed to air dry at room temperature for approximately one hour or in a suitably heated oven for a lesser time as, for example, for 5 minutes at 300° F.

The preliminary preparation of the edges of the glass to be bonded having been described, the bonding process itself will now be described in conjunction with the accompanying drawings.

Figure 3:
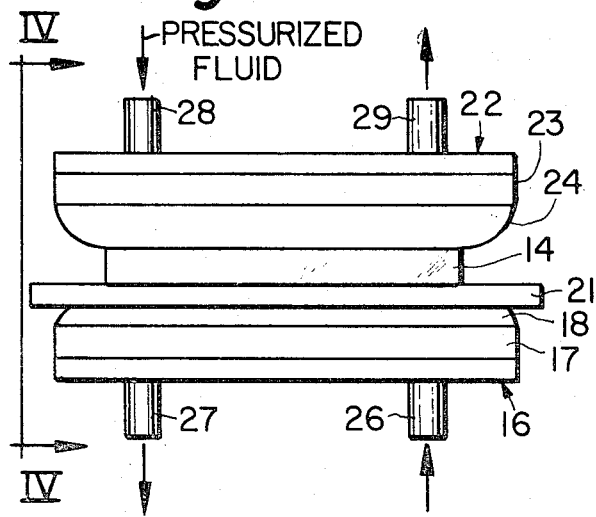
Figure 4:
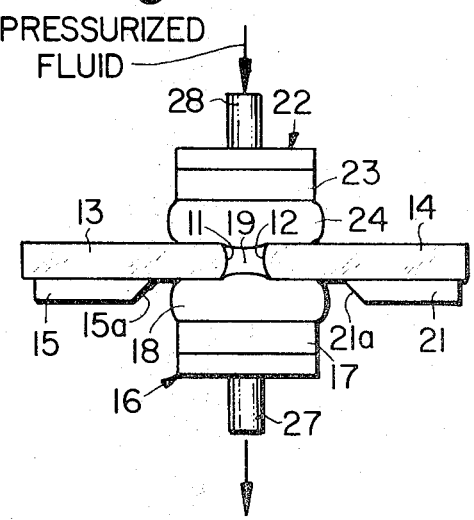
FIG. 4 is a view taken generally along line IV—IV of FIG. 3 and further illustrating the same step or steps of the invention illustrated in FIG. 3.

As best illustrated in FIGS. 1 and 4, a prepared piece of glass, such as glass 13 previously mentioned, is disposed and securely held in any convenient manner on a supporting platform or shelf 15 with edge 11 of the glass overhanging edge 15a of such shelf and disposed above a first hollow pressing platen 16 (FIGS. 3 and 4) adjacent the top of which is hermetically attached, as by a metal band 17 tightly surrounding the platen, a flexible, elastic or resilient membrane or diaphragm 18 which is actuable in an upward direction to supply pressure against the bottom surfaces of the pieces of glass such as 13 and 14 as hereinafter discussed in detail. Membrane or diaphragm 18 may, for example, be fabricated from silicone rubber cloth which is backed with a plastic-coated glass cloth for purposes also hereinafter discussed.

Figure 5:
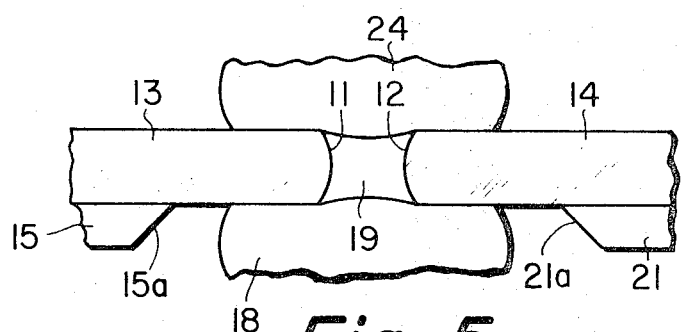
FIG. 5 is a view of a portion of the view of FIG. 4 enlarged for purposes of better illustration, and FIG. 6 comprises a view of a completed bonded article comprising two pieces of glass with a piece of silicone rubber therebetween and bonded to each other by the method of the invention.

Following the positioning of the piece of glass 13 on shelf 15 a length of silicone rubber 19, such as previously discussed, is placed on membrane 18 with one longitudinal edge thereof abutting edge 11 of glass 13 along the length thereof (see FIGS. 1 and 6) such length of rubber being of a thickness substantially corresponding to that of glass 13 and preferably of uniform rectangular cross-sectional dimensions throughout its length. A second piece of prepared glass, such as glass 14 previously mentioned, is disposed on a supporting platform or shelf 21 (FIGS. 3 and 4) with edge 12 of the glass abutting against the longitudinal edge of the length of rubber 19 opposite that against which edge 11 of glass 13 abuts. Such edge 12 overhangs edge 21a of shelf 21 and is disposed above membrane 18 of pressing platen 16 (FIGS. 4 and 5).

Figure 2:
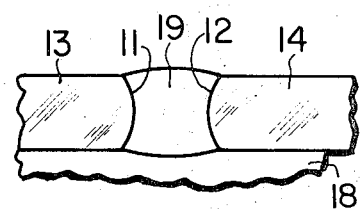

Shelves 15 and 21 are of a length at least equal to the pieces of glass to be bonded (see FIG. 3) and are securely supported in any convenient manner with the edges 15a and 21a thereof equally spaced apart and laterally adjacent membrane 18 of pressing platen 16 (FIG. 4) throughout the length of the shelves. Following the above-mentioned positioning of glass 14 on shelf 21, such glass is moved or pressed in against the edge of the length of rubber 19 which is contacted by edge 12 of such glass and the length of rubber 19 is thereby deformed to conform to the contours of the rounded off edges 11 and 12 of the pieces of glass 13 and 14, respectively (FIG. 2). Such deformation of the length of rubber 19 causes the upper and lower surfaces thereof to curve slightly upwardly and downwardly, respectively, across the width of the length of rubber as illustrated in FIG. 2.

As illustrated in FIGS. 3 and 4 there is disposed above pressing platen 16 a second hollow pressing platen 22 adjacent the bottom of which is hermetically attached, as by a metal band 23 tightly surrounding the platen, a flexible, elastic or resilient membrane or diaphragm 24 which is actuable, as hereinafter discussed, in a downward direction to supply pressure against the upper surfaces of the pieces of glass such as 13 and 14. It is apparent that platen 22 and its associated parts are similar in structure to platen 18 and its associated parts, and membrane 24, similar to membrane 18 may, for example, also be fabricated from silicone rubber cloth which is backed with a plastic coated glass cloth for the purposes hereinafter discussed. When membranes 18 and 24 are made of silicone rubber it is expedient to provide a strip of Teflon® tape along the length of each membrane in the regions thereof to be contacted by the length of silicone rubber such as 19. Such tape may have an adhesive backing for securing it to membranes 18 and 24 and is for the purpose of assuring that the length of silicone rubber such as 19 does not become stuck to the silicone rubber of membranes 18 and 24 during the subsequent bonding step per se of the invention.

Following the positioning of the pieces of glass such as 13 and 14, and the length of silicone rubber such as 19 as discussed above, pressing platen 22 is lowered so that membrane 24 thereof contacts the upper surfaces of said glass and said length of rubber, the pressing platen 22 being securely held in such lowered position in any convenient manner. Subsequent to the lowering of pressing platen 22 and the securing of such platen in its lowered position, heated fluid under pressure is supplied to and circulated through the hollows of each respective platen. Such fluid may, for example, be heated oil and, when membranes 18 and 24 are silicone rubber, the previously mentioned plastic coated glass cloth is employed as a backing material for the rubber to assure that the oil does not seep through the rubber.

The heated fluid is circulated through pressing platen 16 by being supplied thereto through a fluid conduit 26 and being permitted to flow therefrom through a fluid conduit 27 (FIG. 3). Similarly, the heated fluid is circulated through pressing platen 22 by being supplied thereto through a fluid conduit 28 and being permitted to flow therefrom through a fluid conduit 29. The direction of flow of the fluid through platens 16 and 22 is shown by the arrows in FIG. 3 indicating the direction of circulation through each of the platens. It will be noted that the directions of flow or of circulation of the heated fluid through platens 16 and 22 are illustrated as opposite to each other. Such arrangement is for the purpose of, insofar as possible, uniformly distributing the heat from the fluid over the lengths of the silicone rubber 19 and the glasses 13 and 14.

The heated fluid may be provided from any suitable constant pressure source thereof and the pressure of the fluid supplied to the platens may have a pressure of 30 p.s.i. but is preferably maintained at a pressure in the neighborhood of 17 p.s.i. Such pressurized fluid expands the elastic membranes 18 and 24, and as shown in FIGS. 4 and 5, and as best illustrated in FIG. 5, the length of silicone rubber 19 is uniformly compressed and maintained between edges 11 and 12 of glasses 13 and 14. The compression of the silicone rubber and the heat supplied thereto through membranes 18 and 24 from the heated oil at least partially cures the silicone rubber, the extent of such curing being dependent on the time temperature cycles employed as discussed hereinafter. It is pointed out at this time that the silicone rubber 19 will shrink about 3% during the initial curing thereof by the heat and pressure from membranes 18 and 24. However, such membranes being elastic or flexible they will expand into that part of the space between the edges 11 and 12 of glasses 13 and 14 that is vacated by shrinkage of the rubber 19 and, thereby, uniformly maintain pressure and the supply of heat to the rubber to securely bond it to said edges while the rubber is being at least partially cured. Additionally, the flexible or elastic membranes 19 and 24 conform to any variations in the thicknesses of glasses 13 and 14 and, regardless of such variations, assure optimum bonding between the rubber and the glasses.

The time, temperature and pressure ranges employed for bonding the glasses and silicon rubber to each other may vary considerably. For example, when Silastic® silicone rubber is employed for the length of rubber 19, the upper limits of the temperature, pressure and time ranges are 350° F., 30 p.s.i. and 15 minutes, respectively. For mass production purposes, however, ranges substantially below said upper limits are desirable for obvious reasons. Accordingly, experimentation has shown that a temperature of about 325° F., a pressure of about 17 p.s.i. and a time period of about 2 minutes provides excellent bonding of Silastic® to glass using the method of the invention described. However, following such bonding of the silicone rubber and glass, a normal curing schedule in a suitable oven is desirably followed to fully cure the rubber and to develop optimum properties of the rubber and give maximum bond strength. Such curing schedules depend on the type of silicone rubber employed.

Figure 6:
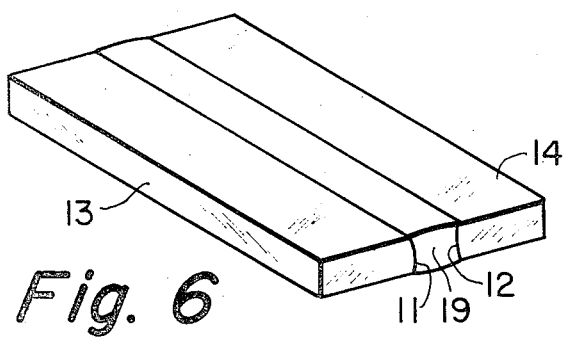

As previously mentioned, FIG. 6 of the drawings illustrates two pieces of glass such as 13 and 14 whose edges 11 and 12 are bonded to opposite edges of a length of silicon rubber 19 disposed between such edges and bonded thereto by using the method of the present invention. Two pieces of glass so bonded or joined can be rotated in either direction about their edges 11 and 12 until the corresponding upper or lower surfaces thereof contact each other. Such rotation is, of course, possible due to the flexing and stretching of the silicone rubber during the manipulation of the glasses in such a manner and the rubber stays securely bonded to the edges of the glasses even during such extreme movements thereof. It is, therefore, readily apparent that the joining or bonding of glasses by the method herein described is ideally suitable for making the hinged glass windows previously discussed.

I claim:

1. A method of bonding selected edges of pieces of glass to opposite edges of a length of uncured silicone rubber to flexibly join and hinge said pieces of glass to each other, such method comprising:
   (a) abutting said selected edges of the pieces of glass against different ones of said edges of the length of silicon rubber;
   (b) applying pressure to said pieces of glass normal to the abutted edges and sufficient only to cause said edges of the length of rubber to conform to the contours of said selected edges of the pieces of glass;
   (c) disposing opposite surfaces of said pieces of glass, at least in the areas thereof adjoining said abutted edges of the glass and rubber, between a outer surfaces of a first and a second flexible membrane hermetically attached to a first and a second hollow pressing platens, respectively;
   (d) circulating heated pressurized fluid through the hollows of said platens and thereby to the inner surfaces of said membranes to expand the membranes and thereby the outer surfaces thereof into firm contact with and against the opposite surfaces of said pieces of glass and with and against the exposed surface portions of said length of silicone rubber to impart heat and pressure to said opposite surface and exposed surface portions from said fluid through said membranes and to maintain such length of rubber between said selected edges of the pieces of glass;
   (e) continuing said circulation of said heated and pressurized fluid through said hollows of the platens for a predetermined time period to at least partially cure said length of rubber by the heat and pressure imparted thereto from said fluid through said membranes and to thereby bond the contacting edges of said pieces of glass and said length of rubber to each other; and,
   (f) following said predetermined time period, removing said bonded pieces of glass and said length of rubber from between said membranes to permit cooling of such glass and rubber.

2. The method in accordance with claim 1 and further including preliminary steps of,
   (a) smoothly rounding off said selected edges of the pieces of glass to reduce the acuity of the angles where such edges meet the surfaces of the pieces of glass;
   (b) thoroughly cleansing and drying said selected edges, and
   (c) applying to said selected edges a primer solution suitable to the type of silicon rubber to which such edges are to be bonded and then drying such primer solution.

3. The method in accordance with claim 1 and in which said fluid is oil at a temperature of approximately 325° F. and at a pressure of about 17 p.s.i., and said predetermined period of time is approximately 2 minutes duration.

4. The method in accordance with claim 2 and in which said fluid is oil at a temperature of approximately 325° F. and at a pressure of about 17 p.s.i., and said predetermined period of time is approximately of 2 minutes duration.

References Cited

UNITED STATES PATENTS

| | | | |
|---|---|---|---|
| 1,916,748 | 7/1933 | Wright | 156—107 |
| 1,924,580 | 8/1933 | Watkins | 156—107 |
| 2,319,534 | 6/1943 | Crowley | 156—304X |
| 2,313,507 | 3/1943 | Billmeyer | 156—107X |
| 3,281,296 | 10/1966 | Jameson | 156—107X |
| 3,406,086 | 10/1968 | Foster | 156—306X |
| 3,018,208 | 1/1962 | Werner et al. | 161—157X |

FOREIGN PATENTS

| | | | |
|---|---|---|---|
| 1,193,013 | 3/1959 | France | 50—267 |

CARL D. QUARFORTH, Primary Examiner

G. SOLYST, Assistant Examiner

U.S. Cl. X.R.

156—304